United States Patent
Gomi et al.

(10) Patent No.: US 12,007,373 B2
(45) Date of Patent: Jun. 11, 2024

(54) LIQUID CHROMATOGRAPH

(71) Applicant: SHIMADZU CORPORATION, Kyoto (JP)

(72) Inventors: Tomohiro Gomi, Kyoto (JP); Daisuke Kitabayashi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 289 days.

(21) Appl. No.: 17/438,419

(22) PCT Filed: Mar. 13, 2019

(86) PCT No.: PCT/JP2019/010420
§ 371 (c)(1),
(2) Date: Sep. 11, 2021

(87) PCT Pub. No.: WO2020/183684
PCT Pub. Date: Sep. 17, 2020

(65) Prior Publication Data
US 2022/0146474 A1 May 12, 2022

(51) Int. Cl.
*G01N 30/20* (2006.01)
*G01N 30/32* (2006.01)
(Continued)

(52) U.S. Cl.
CPC ......... *G01N 30/8675* (2013.01); *G01N 30/32* (2013.01); *G01N 2030/027* (2013.01)

(58) Field of Classification Search
CPC ............... G01N 30/8675; G01N 30/32; G01N 2030/027; G01N 2030/322; G01N 2030/889; G01N 30/88; G01N 2030/326
(Continued)

(56) References Cited

U.S. PATENT DOCUMENTS

| 4,448,692 A | 5/1984 | Nakamoto et al. |
| 2005/0147508 A1 | 7/2005 | Luongo et al. |

(Continued)

FOREIGN PATENT DOCUMENTS

| EP | 0106009 A1 | 4/1984 |
| JP | 60-011690 A | 1/1985 |

(Continued)

OTHER PUBLICATIONS

Office Action for corresponding Chinese Patent Application No. 201980093712.3 dated Jul. 17, 2023, with English language machine translation.
(Continued)

*Primary Examiner* — Robert R Raevis
(74) *Attorney, Agent, or Firm* — Renner, Otto, Boisselle & Sklar, LLP

(57) ABSTRACT

A liquid chromatograph includes a liquid sending pump for sending a mobile phase, a sample injector that injects a sample into an analysis flow path through which a mobile phase from the liquid sending pump flows, a separation column that is provided on the analysis flow path and is to separate a sample that has been injected into the analysis flow path by the sample injector into components, a pressure sensor for detecting a liquid sending pressure in the analysis flow path located at a position farther upstream than the separation column, a damper capacity holder that holds an internal capacity of a system through which a mobile phase from the liquid sending pump flows as a damper capacity, a reference value determiner configured to determine a reference value of a fluctuation range of the liquid sending pressure when a liquid sending failure of the liquid sending pump occurs, using at least the damper capacity held by the damper capacity holder, and a liquid sending failure detector that is configured to periodically acquire a liquid sending (Continued)

pressure detected by the pressure sensor, obtain a fluctuation range of the liquid sending pressure in a certain driving period of the liquid sending pump and detect a liquid sending failure using the obtained fluctuation range and the reference value determined by the reference value determiner.

7 Claims, 4 Drawing Sheets

(51) Int. Cl.
  *G01N 30/86* (2006.01)
  *G01N 30/02* (2006.01)
(58) Field of Classification Search
  USPC ... 73/1.02, 19.01, 19.02, 19.1, 61.52, 61.56, 73/61.57, 37, 61.41, 61.78, 866, 865.5, 73/865.9; 340/603, 605, 626, 632
  See application file for complete search history.

(56) References Cited

U.S. PATENT DOCUMENTS

| | | |
|---|---|---|
| 2008/0245136 A1 | 10/2008 | Gerhardt et al. |
| 2013/0064683 A1 | 3/2013 | Oshima et al. |
| 2014/0299542 A1 | 10/2014 | Song et al. |
| 2016/0153942 A1 | 6/2016 | Yotani et al. |
| 2019/0211813 A1 | 7/2019 | Yanagibayashi et al. |

FOREIGN PATENT DOCUMENTS

| | | |
|---|---|---|
| JP | 11-326300 A | 11/1999 |
| JP | 2000-130353 A | 5/2000 |
| JP | 2001-147222 A | 5/2001 |
| JP | 2004-524518 A | 8/2004 |
| WO | 02/053255 A1 | 7/2002 |
| WO | 2018/055866 A1 | 3/2018 |

OTHER PUBLICATIONS

Office Action for co-pending U.S. Appl. No. 17/438,418 dated Aug. 17, 2023.
Notice of Reasons for Refusal for corresponding Japanese Patent Application No. 2021-505495 dated Jul. 5, 2022, with English language machine translation.
Notice of Reasons for Refusal for corresponding Japanese Patent Application No. 2021-504700 dated Jul. 5, 2022, with English language machine translation.
Notice of Reasons for Refusal for corresponding Japanese Patent Application No. 2021-504712 dated Jul. 26, 2022, with English language machine translation.
Office Action in related Chinese Patent Application No. 201980093792.2 dated Jun. 29, 2023, with English machine translation.
International Search Report for corresponding Application No. PCT/JP2019/010420, mailed Jun. 18, 2019.
Written Opinion for corresponding Application No. PCT/JP2019/010420, mailed Jun. 18, 2019 (English machine translation).
Co-pending U.S. Appl. No. 17/438,076, filed Sep. 10, 2021.
Co-pending U.S. Appl. No. 17/438,418, filed Sep. 11, 2021.
Co-pending U.S. Appl. No. 17/438,421, filed Sep. 11, 2021.
Office Action for co-pending U.S. Appl. No. 17/438,076 dated Nov. 6, 2023.
Notice of Allowance for co-pending U.S. Appl. No. 17/438,418 dated Jan. 8, 2024.
Office Action in Chinese Patent Application No. 201980093792.2 dated Dec. 18, 2023, with English machine translation.
Office Action in co-pending U.S. Appl. No. 17/438,421 dated Apr. 10, 2024.

LIQUID CHROMATOGRAPH

TECHNICAL FIELD

The present invention relates to a liquid chromatograph.

BACKGROUND ART

It is required that a liquid sending system for a liquid chromatograph has an ability to stably send a solvent which is a mobile phase at a set flow rate. As a liquid sending pump to be used in a liquid sending system, a single plunger system including a single plunger pump or a double plunger system including two plunger pumps are employed.

When a plunger pump discharges a solvent, a periodically large fluctuation of liquid sending pressure that is so-called pulsation may occur when a liquid sending pressure decreases due to compression of solvent, leakage of liquid from a check valve, entrapment of fine bubbles in a flow path, shortage of solvent, etc. When pulsation occurs, the flow rate of a mobile phase is disrupted, and a result of analysis is negatively affected. This is a loss for a user. Therefore, measures have been taken to discharge bubbles in the flow path to outside by control of an operation of a plunger pump for suppression of pulsation (see Patent Document 1), removal of bubbles by use of a degassing unit or sending of a solvent at a high flow rate before an analysis is started, etc.

CITATION LIST

Patent Document

[Patent Document 1] JP 2001-147222 A

SUMMARY OF INVENTION

Technical Problem

Even with above-mentioned measures being taken, due to reasons such as a gas component that remained in a solvent becoming bubbles in a plunger pump or bubbles being generated when dissolved oxygen in a solvent was saturated due to a change in temperature, bubbles were entrapped in the plunger pump that was sending liquid, and an analysis continued. In such a case, the user continues to wastefully acquire analysis data.

Here, when a liquid sending failure caused by a liquid sending pump occurs, a liquid sending pressure become unstable. Thus, it is possible to detect whether a liquid sending failure has occurred by reading a fluctuation of liquid sending pressure. However, a sample injector, a separation column, a detector and a pipe that connects them to one another, which constitute an analysis system of a liquid chromatograph respectively have internal capacities. In a case where a liquid sending pump is incorporated in an analysis system of a liquid chromatograph, their internal capacities work as a damper and have an impact on magnitude of fluctuation of liquid sending pressure when a liquid sending failure occurs in a liquid sending pump. The size of an internal capacity that works as a damper is different depending on the number or types of elements that constitute an analysis system. Therefore, when the magnitude of fluctuation of liquid sending pressure is evaluated based on a single reference, a liquid sending failure cannot be detected accurately.

The present invention was conceived considering the above-mentioned problems, and an object of the present invention is to enable accurate detection of a liquid sending failure of a liquid sending pump.

Solution to Problem

A liquid chromatograph according to the present invention includes a liquid sending pump for sending a mobile phase, a sample injector that injects a sample into an analysis flow path through which a mobile phase from the liquid sending pump flows, a separation column that is provided on the analysis flow path and is to separate a sample that has been injected into the analysis flow path by the sample injector into components, a pressure sensor for detecting a liquid sending pressure in the analysis flow path located at a position farther upstream than the separation column, a damper capacity holder that holds an internal capacity of a system through which a mobile phase from the liquid sending pump flows as a damper capacity, a reference value determiner configured to determine a reference value of a fluctuation range of the liquid sending pressure when a liquid sending failure of the liquid sending pump occurs, using at least the damper capacity held by the damper capacity holder, and a liquid sending failure detector that is configured to periodically acquire liquid sending pressures detected by the pressure sensor, obtain a fluctuation range of the liquid sending pressure in a certain driving period of the liquid sending pump and detect a liquid sending failure using the obtained fluctuation range and the reference value determined by the reference value determiner.

Here, in the present invention, "a fluctuation range of the liquid sending pressure in a certain driving period of the liquid sending pump" may be a fluctuation range of the liquid sending pressure in one driving period of the liquid sending pump. However, "a fluctuation range of the liquid sending pressure in a certain driving period of the liquid sending pump" may be a fluctuation range of the liquid sending pressure in a plurality of driving periods of the liquid sending pump or an average value of a fluctuation range of the liquid sending pressure in a plurality of driving periods of the liquid sending pump.

Advantageous Effects of Invention

A liquid chromatograph according to the present invention is configured to hold an internal capacity of a system through which a mobile phase from a liquid sending pump flows as a damper capacity, determine a reference value of a fluctuation range of liquid sending pressure when a liquid sending failure of the liquid sending pump occurs using at least the damper capacity, and detect a liquid sending failure using the determined reference value and a fluctuation range of liquid sending pressure in a certain driving period of the liquid sending pump. Therefore, a liquid sending failure is detected using a reference value in which a damper capacity that differs depending on an analysis system is factored, and a liquid sending failure of the liquid sending pump can be detected accurately.

DESCRIPTION OF EMBODIMENTS

One inventive example of a liquid chromatograph according to the present invention will be described below with reference to the drawings.

Figure 1:
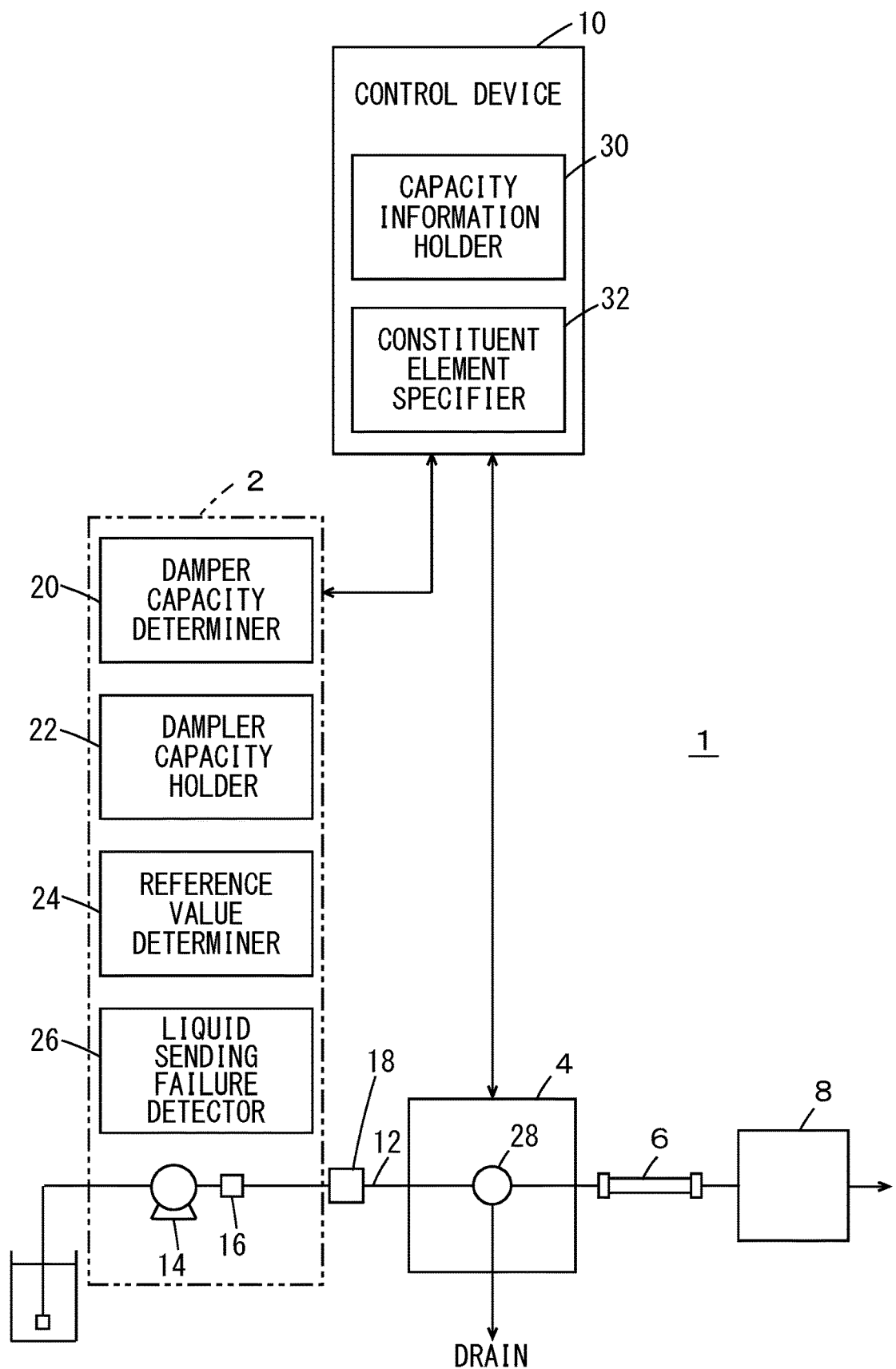
FIG. 1 A schematic diagram showing the configuration of one inventive example of a liquid chromatograph.

As shown in FIG. 1, the liquid chromatograph 1 includes a liquid sending system 2, a sample injector 4, a separation column 6, a detector 8 and a control device 10.

The liquid sending system 2 includes a liquid sending pump 14 that sends a mobile phase into an analysis flow path 12 and a pressure sensor 16 for detecting a liquid sending pressure applied by the liquid sending pump 14. While only one liquid sending pump 14 is shown here, two or more liquid sending pumps may be provided. A mixer 18 is provided at a position farther downstream than the pressure sensor 16, and a mobile phase to be sent by the liquid sending pump 14 is mixed in the mixer 18.

While not being shown in the diagram, the liquid sending pump 14 has two plunger pumps that are driven complementarily with each other and consecutively send liquid, for example. In such a liquid sending pump 14, bubbles are entrapped in pump chambers of the plunger pumps, so that a liquid sending failure which causes instability of liquid sending flow rate occurs.

In the liquid sending system 2, a damper capacity determiner 20, a damper capacity holder 22, a reference value determiner 24 and a liquid sending failure detector 26 are provided as functions for detecting an occurrence of a liquid sending failure caused by the liquid sending pump 14. The damper capacity determiner 20, the reference value determiner 24 and the liquid sending failure detector 26 are functions obtained by execution of a predetermined program in a computer circuit that partially constitutes the liquid sending system 2, and the damper capacity holder 22 is a function implemented by part of a storage area of a storage device that is provided in the liquid sending system 2. Details of the damper capacity determiner 20, the damper capacity holder 22, the reference value determiner 24 and the liquid sending failure detector 26 will be described below.

The sample injector 4 is provided at a position farther downward than the mixer 18 on the analysis flow path 12. The sample injector 4 is to inject a sample into the analysis flow path 12. The sample injector 4 includes a sample loop (not shown) that temporarily holds a sample and a switch valve 28 for switching between a first state in which the sample loop is provided in the analysis flow path 12 and a second state in which the sample loop is not provided in the analysis flow path 12, and is to inject a sample into the analysis flow path 12 when being switched to the first state with a sample being held by the sample loop. Further, the switch valve 28 is configured to switch to a third state in which a mobile phase from the liquid sending system 2 is to be discharged to a drain. The switch valve 28 is not necessarily required to include a function of switching to the third state in which a mobile phase from the liquid sending system 2 is discharged to the drain. A switch valve for switching between sending of a mobile phase from the liquid sending system 2 to the separation column 6 and discharging of a mobile phase to the drain may be provided separately from the sample injector 4. Further, a switch valve having such a function is not necessarily required to be provided.

The separation column 6 is provided at a position farther downstream than the sample injector 4 on the analysis flow path 12, and the detector 8 is provided at a position farther downstream than the separation column 6. The separation column 6 is to separate a sample that has been injected into the analysis flow path 12 by the sample injector 4 into components, and sample components obtained by separation in the separation column 6 are detected by the detector 8.

The control device 10 is to manage the operations of at least the liquid sending system 2 and the sample injector 4, and is realized by a system controller dedicated to the liquid chromatograph and/or a general personal computer, for example. When the liquid sending failure detector 26 of the liquid sending system 2 detects a liquid sending failure in the liquid sending pump 14, a signal indicating detection of a liquid sending failure is transmitted to the control device 10. In this case, when it is set in advance that a purge operation for resolving a liquid sending failure is to be performed, the control device 10 transmits an instruction for switching the switch valve 28 to the third state to the sample injector 4, and transmits an instruction for increasing a liquid sending flow rate to a predetermined high flow rate to the liquid sending system 2. Thus, bubbles entrapped in the liquid sending pump 14 are discharged to the drain.

Further, the control device 10 includes a capacity information holder 30 and a constituent element specifier 32. The capacity information holder 30 is a function implemented by part of the storage area of the storage device provided in the control device 10, and the constituent element specifier 32 is a function obtained by execution of a predetermined program in the control device 10.

The capacity information holder 30 holds information in regard to a system through which a mobile phase from the liquid sending pump 14 flows, that is, information in regard to an internal capacity of each element that can constitute the analysis flow path 12 in addition to information in regard to the system configuration of the liquid chromatograph. Elements that can constitute the analysis flow path 12 include the liquid sending pump 14, a pipe (including the pressure sensor 16) from the outlet port of the liquid sending pump 14 to the inlet port of the mixer 18, the mixer 18, a pipe from the outlet port of the mixer 18 to the inlet port of the sample injector 4, a pipe through which a mobile phase enters, a pipe through which a mobile phase exits, the sample loop for temporarily holding a sample in the sample injector 4, a pipe from the outlet port of the sample injector 4 to the inlet port of the separation column 6, and the separation column 6.

The constituent element specifier 32 is configured to acquire information in regard to the system configuration from the capacity information holder 30, acquire information in regard to the configuration state of the analysis flow path 12 from an element such as the sample injector 4 and specify a current constituent element of the analysis flow path 12. For example, when the sample injector 4 is in the first state, the constituent element specifier 32 includes the sample loop as a constituent element of the analysis flow path 12. When the sample injector 4 is in the second state, the constituent element specifier 32 removes the sample loop from a constituent element of the analysis flow path 12.

The damper capacity determiner 20 of the liquid sending system 2 is configured to determine an internal capacity of a system through which a mobile phase from the liquid sending pump 14 flows as a damper capacity by acquiring information about internal capacities in regard to constituent elements of the analysis flow path 12 specified by the constituent element specifier 32 from the capacity information holder 30 and adding up these internal capacities. While the internal capacities of the constituent elements of the analysis flow path 12 may be simply added up in order to determine a damper capacity, the internal capacity of each constituent element may be multiplied by a predetermined coefficient and then the multiplied internal capacities may be added up in consideration of contribution of a location at which each constituent element is provided to compression of a mobile phase. A damper capacity determined by the damper capacity determiner 20 is held by the damper capacity holder 22. A damper capacity held by the damper capacity holder 22 is used for determination of a reference value by the reference value determiner 24. Further, a function of the damper capacity determiner 20 can be provided in the control device 10. In this case, the liquid sending system 2 is notified of a damper capacity determined in the control device 10, and the damper capacity is held by the damper capacity holder 22.

Here, a fluctuation of liquid sending pressure in a case where bubbles are entrapped in the liquid sending pump will be described with reference to a pressure waveform of FIG. 4.

Figure 4:
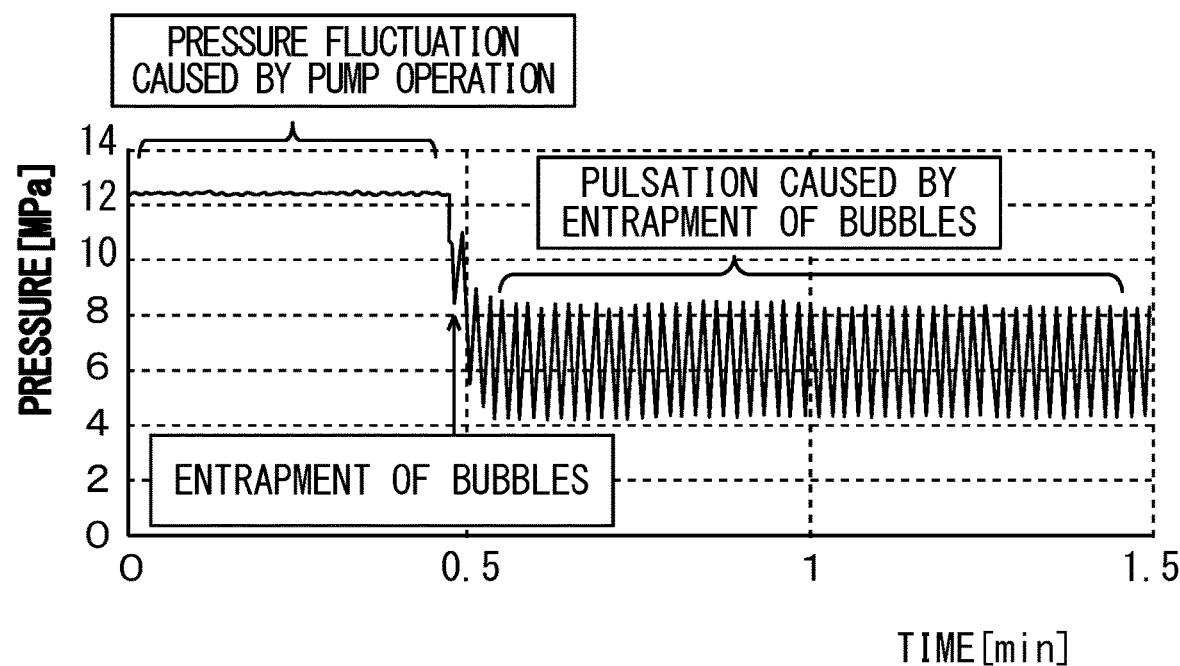
FIG. 4 One example of a waveform of liquid sending pressure when bubbles are entrapped in a liquid sending pump.

As shown in the left part of the pressure waveform of FIG. 4, in a state in which a mobile phase can be sent stably, although a subtle pressure fluctuation caused by an operation of the liquid sending pump, or the like can be seen, the liquid sending pressure is stable. In a case where bubbles are entrapped in one plunger pump of the liquid sending pump 14, when the plunger pump is performing a discharging operation, liquid is not discharged normally due to compression of bubbles, and a liquid sending pressure decreases rapidly. When the other plunger pump is performing a discharging operation, a liquid sending pressure increases since liquid is discharged normally. As shown in the right part of the pressure waveform of FIG. 4, a periodical fluctuation (pulsation) of liquid sending pressure occurs. Therefore, the liquid sending failure detector 26 is configured to detect a liquid sending failure by detecting pulsation that is synchronized with a driving period of the liquid sending pump 14.

As described above, a period of pulsation of liquid sending pressure caused by entrapment of bubbles in the liquid sending pump 14 is synchronized with a driving period of the liquid sending pump 14 in which bubbles are entrapped. Therefore, in order to detect pulsation, it is necessary to acquire a signal of the pressure sensor 16 frequently enough to be able to read a fluctuation of liquid sending pressure in one driving period of the liquid sending pump 14. Therefore, the frequency of acquisition of a signal by a computer circuit that constitutes the liquid sending failure detector 26 from the pressure sensor 16 may be adjusted in accordance with a driving speed of the liquid sending pump 14. In this case, a period for reading a signal from the pressure sensor 16 can be determined by calculation when a liquid sending flow rate is determined.

The liquid sending failure detector 26 is configured to detect pulsation by obtaining a fluctuation range of liquid sending pressure in a certain driving period of the liquid sending pump 14 and comparing the fluctuation range with a reference value determined by the reference value determiner 24.

The reference value determiner 24 is configured to determine a reference value in regard to a fluctuation range of liquid sending pressure to be used for detection of pulsation by using at least a damper capacity held by the damper capacity holder 22.

Here, a fluctuation range ΔP of liquid sending pressure caused by bubbles entrapped in the liquid sending pump 14 is determined by a time constant τ of the liquid chromatograph. A time constant τ is a value that depends on an entire liquid sending pressure P[MPa], a damper C[uL/MPa] and a liquid sending flow rate [mL/min]. A damper C[uL/MPa] can be obtained when a damper capacity V[uL] held by the damper capacity holder 22 is multiplied by a compression ratio β[GPa$^{-1}$] of a mobile phase. For example, in a case where a length of time that has elapsed since bubbles are entrapped in the liquid sending pump 14 is t seconds, it is considered that a fluctuation range ΔP of liquid sending pressure is determined by a following formula.

$$\Delta P \propto e^{-\frac{t}{\tau}} = f(P, C, Q, t)$$

Therefore, a reference value for determination in regard to whether pulsation is caused by entrapment of bubbles in the liquid sending pump 14 can be determined in consideration of ΔP obtained by the above-mentioned formula. However, some of arguments P, C, Q, t (or P, V, β, Q, t) of the above-mentioned formula may be not used, and a reference value may be determined more simply. For example, ΔP that is obtained when only P, C are taken as arguments and other elements are taken as fixed values may be used as a reference. In a case where a mobile phase is sent into the common analysis flow path 12 by a plurality of liquid sending pumps, a contribution ratio of each liquid sending pump with respect to a liquid sending flow rate (liquid sending pressure) is taken into consideration.

One example of algorithm of pulsation detection will be described with reference to the flowchart of FIG. 2.

Figure 2:
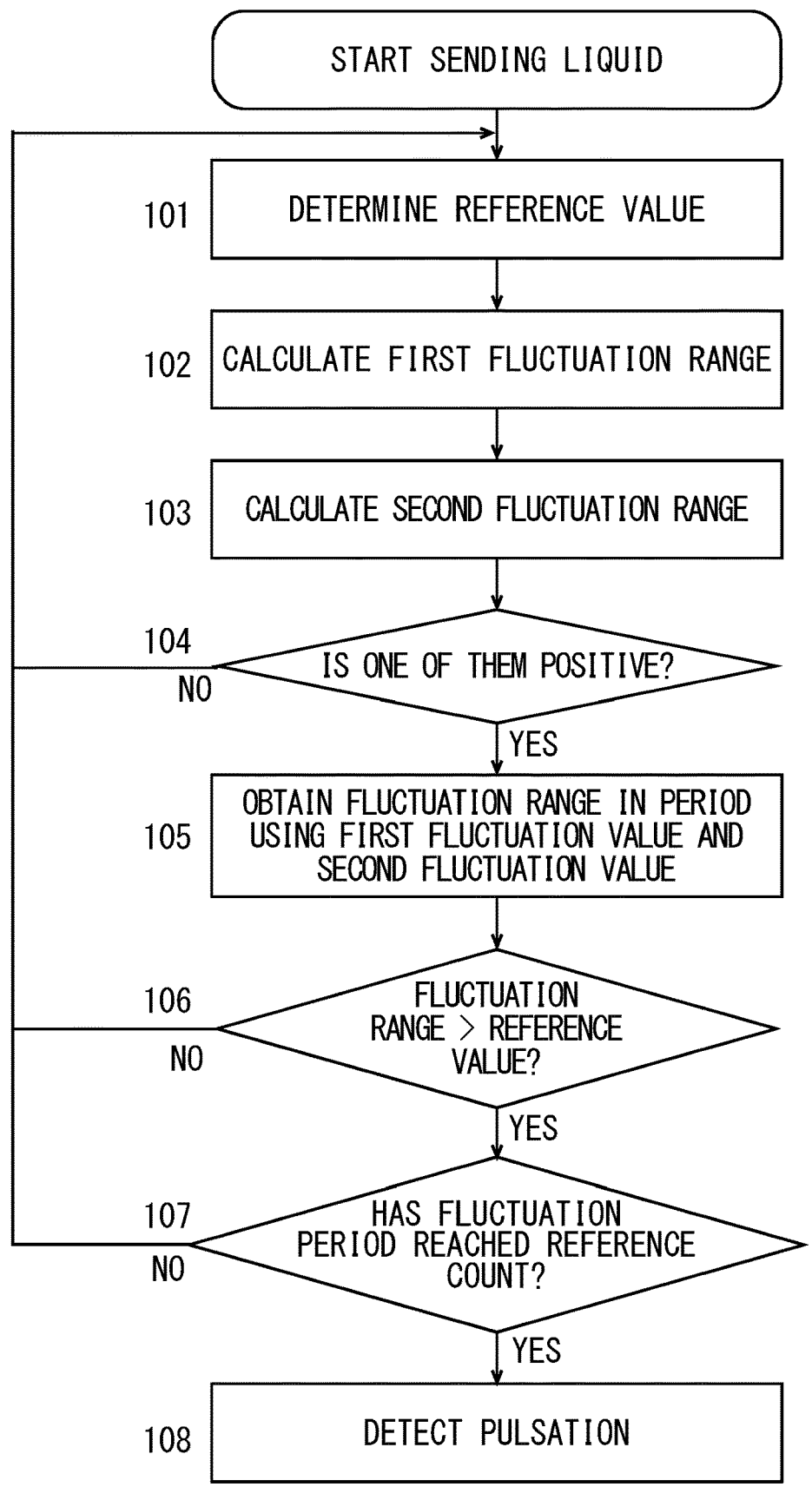
FIG. 2 A flowchart for explaining the algorithm of pulsation detection in the same inventive example.

The example of FIG. 2 is advantageous in a case where a fluctuation of liquid sending pressure in one driving period of the liquid sending pump 14 can be read in several tens of segments. In this case, liquid sending pressures at a start point and an end point of a discharging operation of each plunger pump of the liquid sending pump 14 can be read accurately. Here, one driving period of the liquid sending pump 14 refers to a period from a point in time at which one plunger pump of the plunger pumps that constitute the liquid sending pump 14 starts a discharging operation to a point in time at which the other plunger pump ends a discharging operation.

A computer circuit that constitutes the reference value determiner 24 and the liquid sending failure detector 26 acquires signals of the pressure sensor 16 at a predetermined frequency and reads a liquid sending pressure (moving average value). The reference value determiner 24 and the liquid sending failure detector 26 execute the below-mentioned steps 101 to 108.

The reference value determiner 24 determines a reference value using a read liquid sending pressure and a damper capacity held by the damper capacity holder 22 (step 101). Thereafter, when reading liquid sending pressures at a start point and an end point of a discharging operation of one plunger pump of the plunger pumps that constitute the liquid sending pump 14, the liquid sending failure detector 26 obtains the difference (the liquid sending pressure at the start point minus the liquid sending pressure at the end point) as a first fluctuation value (step 102). When reading liquid sending pressures at a start point and an end point of a discharging operation of the other plunger pump, the liquid sending failure detector 26 obtains the difference (the liquid sending pressure at the start point minus the liquid sending pressure at the end point as a second fluctuation value (step 103). In a case where bubbles are entrapped in one of the plunger pumps that constitute the liquid sending pump 14, a liquid sending pressure decreases when one plunger pump in which bubbles are entrapped is performing a discharging operation, and a liquid sending pressure increases when the other plunger pump in which bubbles are not entrapped is performing a discharging operation. Therefore, in a case where a liquid sending failure caused by entrapment of bubbles has occurred in the liquid sending pump 14, only one of the first fluctuation value and the second fluctuation value is a positive value (the other value is a negative value). Therefore, in a case where the signs of a first fluctuation value and a second fluctuation value are the same, the liquid sending failure detector 26 determines that pulsation is not caused by entrapment of bubbles (step 104).

In a case where only one of a first fluctuation value and a second fluctuation value is a positive value, the liquid sending failure detector 26 obtains a fluctuation range of liquid sending pressure in one driving period of the liquid sending pump 14 using the first fluctuation value and the second fluctuation value (step 105). A fluctuation range of liquid sending pressure can be obtained by a following formula, for example.

A fluctuation range=|a first fluctuation value−a second fluctuation value|/2

The above-mentioned formula is one example, and a fluctuation range may be obtained using a formula such as A fluctuation range=|a first fluctuation value−a second fluctuation value| or

A fluctuation range=(a first fluctuation value−a second fluctuation value)$^2$

The liquid sending failure detector 26 compares the above-mentioned fluctuation value with a predetermined reference value (step 106). In a case where the fluctuation value exceeds the reference value, the liquid sending failure detector 26 counts the number of consecutive driving periods (fluctuation periods) in which the fluctuation value exceeds the reference value (step 107). Then, when the number of consecutive fluctuation periods reaches a predetermined reference count, pulsation is detected (step 108).

Here, the reference count which is a reference in regard to the number of consecutive pressure fluctuating periods that is used for determination of pulsation may be adjusted variably. In this case, the reference count can be adjusted in accordance with the degree of sensitivity of pulsation detection.

The algorithm for pulsation detection is not limited to the above-mentioned algorithm. For example, it is possible to detect pulsation by monitoring a liquid sending pressure in each driving period of the liquid sending pump 14, obtaining a fluctuation range of liquid sending pressure in one driving period and comparing the fluctuation range with a reference value determined by the reference value determiner 24.

Figure 3:
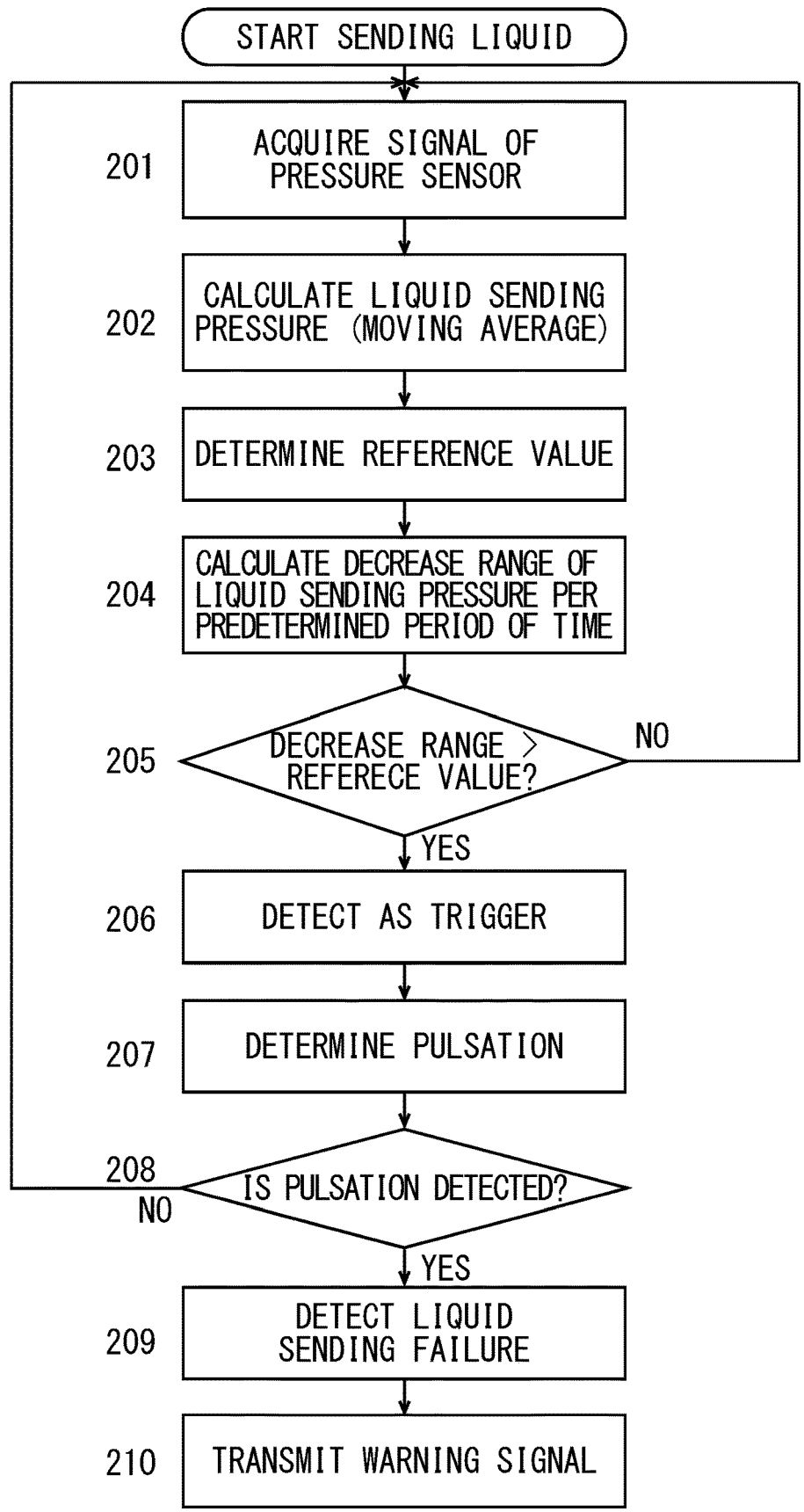
FIG. 3 A flowchart for explaining the algorithm of detection of a trigger in the same inventive example.

The above-mentioned algorithm is effective in a case where liquid sending pressures at a start point and an end point of a discharging operation of each plunger pump that constitutes the liquid sending pump 14 cannot be accurately read. However, with the algorithm, because whether a liquid sending pressure has decreased or increased in one driving period of the liquid sending pump 14 cannot be judged, whether a pressure fluctuation is caused by entrapment of bubbles cannot be certainly determined. As such, before the algorithm for pulsation detection is executed, algorithm for detection of a trigger as shown in the flowchart of FIG. 3 may be introduced.

The algorithm shown in the flowchart of FIG. 3 will be described below.

A computer circuit that constitutes the reference value determiner 24 and the liquid sending failure detector 26 reads signals of the pressure sensor 16 in a predetermined period (step 201) and calculates a liquid sending pressure (moving average value) (step 202). The reference value determiner 24 determines a reference value for detection of a trigger using a read liquid sending pressure and a damper capacity held by the damper capacity holder 22 (step 203). A reference value for detection of a trigger may be the same as or different from a reference value for detection of pulsation. The liquid sending failure detector 26 calculates a decrease range of liquid sending pressure per length of time (a length of time in which a signal is read ten times, for example) that is set based on a driving period of the liquid sending pump 14 (step 204). Then, the calculated decrease range is compared with a reference range determined by the reference value determiner 24 (step 205). When the decrease range exceeds the reference value, a trigger for an occurrence of pulsation is detected (step 206).

After detecting a trigger, the liquid sending failure detector 26 detects pulsation using the above-mentioned algorithm for pulsation detection (step 207). In a case where pulsation is detected, the liquid sending failure detector 26 detects a liquid sending failure (steps 208, 209) and transmits a warning signal to the control device 10 (step 210). In a case where pulsation is not detected, the process returns to the above-mentioned step 201 (step 208).

Coefficients to be used for determination of a period for reading a signal from the pressure sensor 16, a reference value for detection of a trigger and a reference value for pulsation detection by calculation may be adjusted variably based on a user's input of a change instruction or user's evaluation in regard to a result of actual detection of liquid sending failure. Further, in a case where the analysis system of the liquid chromatograph is connected to a common database shared with an analysis system of another liquid chromatograph through a network line such as an internet line, each coefficient, described above, may be automatically adjusted based on user's evaluation accumulated in the database in regard to a result of detection of liquid sending failure.

Here, when the sample injector 4 injects a sample into a mobile phase, a rapid decrease of liquid sending pressure caused by a change of the configuration of flow path by the switch valve may occur. However, in such a case, a periodical fluctuation of liquid sending pressure does not occur after a liquid sending pressure decreases rapidly. Therefore, the liquid sending failure detector 26 does not detect pulsation or does not erroneously detect a liquid sending failure caused by entrapment of bubbles. Further, in a case where liquid is sent in a gradient, a liquid sending pressure may decrease due to a change in composition of a mobile phase. However, in this case, a periodical fluctuation of liquid sending pressure does not occur either, so that the liquid sending failure detector 26 does not detect pulsation or does not erroneously detect a liquid sending failure caused by entrapment of bubbles.

While the liquid sending system 2 is provided with each function of the damper capacity determiner 20, the damper capacity holder 22, the reference value determiner 24 and the liquid sending failure detector 26 in the above-mentioned inventive example, the present invention is not limited to this. Part or all of these functions may be provided in the control device 10.

The above-mentioned inventive example is merely one example of embodiments of the liquid chromatograph. The embodiments of the liquid chromatograph according to the present invention is as follows.

In an embodiment of a liquid chromatograph according to the present invention, the liquid chromatograph includes a liquid sending pump for sending a mobile phase, a sample injector that injects a sample into an analysis flow path through which a mobile phase from the liquid sending pump flows, a separation column that is provided on the analysis flow path and is to separate a sample that has been injected into the analysis flow path by the sample injector into components, a pressure sensor for detecting a liquid sending pressure in the analysis flow path located at a position farther upstream than the separation column, a damper capacity holder that holds an internal capacity of a system through which a mobile phase from the liquid sending pump flows as a damper capacity, a reference value determiner configured to determine a reference value of a fluctuation range of the liquid sending pressure when a liquid sending failure of the liquid sending pump occurs, using at least the damper capacity held by the damper capacity holder, and a liquid sending failure detector that is configured to periodically acquire liquid sending pressures detected by the pressure sensor, obtain a fluctuation range of the liquid sending pressure in a certain driving period of the liquid sending pump and detect a liquid sending failure using the obtained fluctuation range and the reference value determined by the reference value determiner.

In a first aspect of an embodiment of the liquid chromatograph according to the present invention, the liquid chromatograph includes a capacity information holder that holds information in regard to an internal capacity of each of a plurality of elements that is capable of constituting a system through which a mobile phase from the liquid sending pump flows, a constituent element specifier configured to specify a constituent element of a system through which a mobile phase from the liquid sending pump flows, and a damper capacity determiner configured to use an internal capacity held by the capacity information holder in regard to a constituent element specified by the constituent element specifier and determine the damper capacity, wherein the damper capacity holder is configured to hold a damper capacity determined by the damper capacity determiner. With such an aspect, an accurate damper capacity based on the constituent elements of the analysis flow path of the liquid chromatograph can be used for determination of a reference value, and accuracy of detection of a liquid sending failure can be improved.

In the above-mentioned first aspect, the sample injector may have a sample loop temporarily holding a sample and is configured to switch between a first state in which the sample loop is provided in the analysis flow path and a second state in which the sample loop is not provided in the analysis flow path, the capacity information holder may hold an internal capacity of the sample loop, and the constituent element specifier may be configured to include the sample loop in the constituent element when the sample injector is in the first state, and remove the sample loop from the constituent element when the sample injector is in the second state. Thus, a damper capacity that changes depending on the state of the sample injector can be accurately reflected for determination of a reference value, and accuracy of detection of a liquid sending failure is further improved.

In a second aspect of the embodiment of the liquid chromatograph according to the present invention, the liquid sending failure detector is configured to execute a pulsation detection step of detecting pulsation on a condition that a count of consecutive periods in which the fluctuation range exceeds a reference value determined by the reference value determiner exceeds a predetermined reference count, and a liquid sending failure detection step of detecting a liquid sending failure of the liquid sending pump when the pulsation is detected in the pulsation detection step, in this order. With such an aspect, pulsation caused by entrapment of bubbles in the liquid sending pump can be detected.

As a specific example of the above-mentioned second aspect, the liquid sending pump is a double plunger pump including two plunger pumps that are driven complementarily with each other, and the liquid sending failure detector, in the pulsation detection step, is configured to obtain a difference between the liquid sending pressures at a start point and an end point of a discharging operation of one of the two plunger pumps as a first fluctuation value, obtain a difference between the liquid sending pressures a start point and an end point of a discharging operation of another one of the two plunger pumps as a second fluctuation value and obtain the fluctuation range using the first fluctuation value and the second fluctuation value. With such a specific example, pulsation can be detected in consideration of a fluctuation of liquid sending pressure during a discharging operation of one plunger pump of the liquid sending pump and a fluctuation of liquid sending pressure during a discharging operation of the other plunger pump. Thus, pulsation caused by entrapment of bubbles can be detected more accurately.

As another specific example of the aspect of the above-mentioned specific example, the liquid sending failure detector is configured to count only a period in which only one of the first fluctuation value and the second fluctuation value is a positive value as a period in which the fluctuation range exceeds a reference value determined by the reference value determiner. In a case where bubbles are entrapped in one plunger pump of the double plunger pump, a liquid sending pressure decreases during a discharging operation of the one plunger pump, and a liquid sending pressure increases during a discharging operation of the other plunger pump. Thus, the first fluctuation value and the second fluctuation value have different signs. Therefore, it is possible to detect pulsation more accurately by counting a period in which only one of the first fluctuation value and the second fluctuation value is a positive value as one period of pulsation.

Further, the liquid sending failure detector, before the pulsation detection step, may be configured to execute a pressure decrease calculation step of calculating a decrease range of a liquid sending pressure per length of time that is set based on the driving period of the liquid sending pump, and a trigger detection step of detecting a trigger for an occurrence of pulsation when a decrease range calculated in the pressure decrease calculation step exceeds a reference value determined by the reference value determiner, and execute pulsation determination step after detecting the trigger in the trigger detection step. Thus, even in a case where a detailed fluctuation of liquid sending pressure in one driving period of the liquid sending pump cannot be read, pulsation caused by entrapment of bubbles in the liquid sending pump can be detected accurately.

REFERENCE SIGNS LIST

1 Liquid chromatograph
2 Liquid sending system
4 Sample injector
6 Separation column
8 Detector
10 Control device
12 Analysis flow path
14 Liquid sending pump
16 Pressure sensor
18 Mixer
20 Damper capacity determiner
22 Damper capacity holder
24 Reference value determiner
26 Liquid sending failure detector
28 Switch valve
30 Capacity information holder
32 Constituent element specifier

The invention claimed is:

1. A liquid chromatograph comprising:
a liquid sending system having an analysis flow path and including:
  a liquid sending pump for sending a mobile phase through the analysis flow path;
  a sample injector that injects a sample into the mobile phase flowing through the analysis flow path;
  a separation column provided on the analysis flow path and configured to separate the injected sample into components; and
  a pressure sensor for detecting a liquid sending pressure in the analysis flow path, wherein the pressure sensor is located at a position farther upstream along the analysis flow path than the separation column;
computer circuitry configured to:
  hold in memory a capacity value representing an internal capacity of the liquid sending system;
  determine a reference fluctuation range of the liquid sending pressure based on the capacity value; and
  periodically acquire liquid sending pressures detected by the pressure sensor;
  obtain a fluctuation range of the liquid sending pressure in a certain during a driving period of the liquid sending pump; and
  detect a liquid sending failure based on the obtained fluctuation range and the reference fluctuation range.

2. The liquid chromatograph according to claim 1, wherein the computer circuitry is further configured to:
hold in the memory information regarding an internal capacity of each of a plurality of elements that is capable of constituting a system through which a mobile phase from the liquid sending pump flows;
specify a constituent element of a system through which a mobile phase from the liquid sending pump flows; and
use an internal capacity held in the memory in regard to the specified constituent element and determine the capacity, wherein the memory is configured to hold the determined capacity.

3. The liquid chromatograph according to claim 2, wherein
the sample injector has a sample loop temporality holding a sample and is configured to switch between a first state in which the sample loop is provided in the analysis flow path and a second state in which the sample loop is not provided in the analysis flow path, the memory holds an internal capacity of the sample loop, and
the computer circuitry is further configured to include the sample loop in the constituent element when the sample injector is in the first state, and remove the sample loop from the constituent element when the sample injector is in the second state.

4. The liquid chromatograph according to claim 1, wherein the computer circuitry is further configured to execute:
a pulsation detection step of detecting pulsation on a condition that a count of consecutive periods in which the fluctuation range exceeds the reference fluctuation range exceeds a predetermined reference count; and
a liquid sending failure detection step of detecting a liquid sending failure of the liquid sending pump when the pulsation is detected in the pulsation detection step, in this order.

5. The liquid chromatograph according to claim 4, wherein the liquid sending pump is a double plunger pump including two plunger pumps that are driven complementarily with each other, and
the computer circuitry, in the pulsation detection step, is configured to obtain a difference between the liquid sending pressures at a start point and an end point of a discharging operation of one of the two plunger pumps as a first fluctuation value, obtain a difference between the liquid sending pressures a start point and an end point of a discharging operation of another one of the two plunger pumps as a second fluctuation value and obtain the fluctuation range using the first fluctuation value and the second fluctuation value.

6. The liquid chromatograph according to claim 5, wherein the computer circuitry is further configured to count only a period in which only one of the first fluctuation value and the second fluctuation value is a positive value as a period in which the fluctuation range exceeds the reference fluctuation range.

7. The liquid chromatograph according to claim 4, wherein the computer circuitry, before the pulsation detection step, is further configured to execute:
a pressure decrease calculation step of calculating a decrease range of a liquid sending pressure per length of time that is set based on the driving period of the liquid sending pump; and
a trigger detection step of detecting a trigger for an occurrence of pulsation when a decrease range calculated in the pressure decrease calculation step exceeds the reference fluctuation range, and
execute pulsation determination step after detecting the trigger in the trigger detection step.

* * * * *